United States Patent [11] 3,575,552

[72] Inventors Norman H. Grant;
Edward Reingold, New York, N.Y.
[21] Appl. No. 758,286
[22] Filed Sept. 9, 1968
[45] Patented Apr. 20, 1971
[73] Assignee American Broadcasting Companies, Inc. New York, N.Y.

[54] MOTION PICTURE PRODUCTION SYSTEM AND METHOD
18 Claims, 9 Drawing Figs.

[52] U.S. Cl. .......... 178/5.8, 178/6.8, 179/100.2, 352/25
[51] Int. Cl. .......... G03b 31/00, G11b 5/00, H04h 7/18
[50] Field of Search .......... 178/5.8, 6 (F & M), 6 (PD), 6 (IND); 352/6, 25, 56; 179/100.2 (B)

[56] References Cited

UNITED STATES PATENTS

| | | | |
|---|---|---|---|
| 2,682,572 | 6/1954 | Graham | 178/5.8 |
| 2,927,154 | 3/1960 | Wolfe | 178/6.6 |
| 3,364,306 | 1/1968 | Brown | 178/6. |

OTHER REFERENCES

Tremaine, Howard M. THE AUDIO CYCLOPEDIA, New York, Howard W. Sams & Co., Inc. 1958 TK 5981 T72 pages 551–2

The American Cinematographer Apr. 1968 pp. 260–261, 302

Kino-Technik vol. 20(1966) No. 6 pages 139–142

Rundfunktechnische Mitteilungen vol. 5(1961) No. 3 pp 101–7

*Primary Examiner*—Terrell W. Fears
*Assistant Examiner*—Howard W. Britton
*Attorney*—Curtis, Morris & Safford

ABSTRACT: In the production system, up to six camera units, each including a video camera and a motion picture camera, are used in making a motion picture. The video signals from the video cameras are sent to a control console where they are displayed on individual television monitors. By remote control of the camera unit from the console, the cameras are operated so that, if desired, only one of the cameras operates at a given time, and only the film from that camera is used in making the motion picture. The edge of the film in each camera is marked by exposing it to a colored light whenever that camera is operating, and a coded audio tone signal unique to that camera is recorded beside the program sound on a separate magnetic tape simultaneously with the marking of the motion picture film. At the same time, the instructions of the program director are recorded on the tape beside the tone code signals and program sound. In editing the film, the director's instructions are reproduced. Then, the colored marks on the film and the tone code signals are reproduced, the starting points of the marks are aligned with one another, and the film is cut and spliced in accordance with the director' s instructions. The system also includes novel tone coding means, as well as novel lap dissolve means.

INVENTORS:
NORMAN H. GRANT
EDWARD REINGOLD
BY
Curtis, Morris & Safford
ATTORNEYS INVENTORS
NORMAN H. GRANT
EDWARD REINGOLD
BY
Curtis, Morris & Safford
ATTORNEYS INVENTOR
NORMAN H. GRANT
EDWARD REINGOLD
BY
Curtis, Morris & Safford
ATTORNEYS INVENTORS:
NORMAN H. GRANT
EDWARD REINGOLD
BY
Curtis, Morris & Safford
ATTORNEYS

MOTION PICTURE PRODUCTION SYSTEM AND METHOD

This invention relates to systems and methods for producing motion pictures, and, more particularly, to systems and methods for producing motion pictures intended to be shown on television.

It always has been a problem to keep the cost and length of time required to make motion pictures at a minimum. This problem is accentuated if the motion pictures are intended for use primarily in television. A significant portion of the money and time spent in making a motion picture is spent in editing the picture; that is, in cutting the length of the film so that it will be of a proper time duration, and, if multiple cameras are used in taking the film, in cutting and splicing together the film portions from the different cameras. In the production of motion pictures by the use of multiple cameras, an additional problem is that, since the sound is not recorded on the film with the pictures, the editor must synchronize the sound with the pictures. Synchronizing usually is time consuming and tedious. A further problem is created by the fact that in many prior multiple-camera systems, all of the cameras are allowed to run continuously. In editing the film in such prior systems, additional time is required to handle the unused portions of film from each camera, and costs are further increased because large amounts of film are wasted.

Accordingly, it is an object of the present invention to provide a multiple-camera motion picture production system and method in which the amount of editing time and cost required is significantly less than in prior systems. It is a further object of the present invention to provide such a system and method in which switching among multiple cameras can be accomplished quickly and with accuracy. It is a more specific object of the present invention to provide such a system which is versatile and can be used to provide lap dissolve modes of operation, and other suitable modes of operation, automatically by the operation of pushbuttons in remote control equipment. Other objects and aspects of the present invention will be made evident in the following description and drawings.

Figure 6:
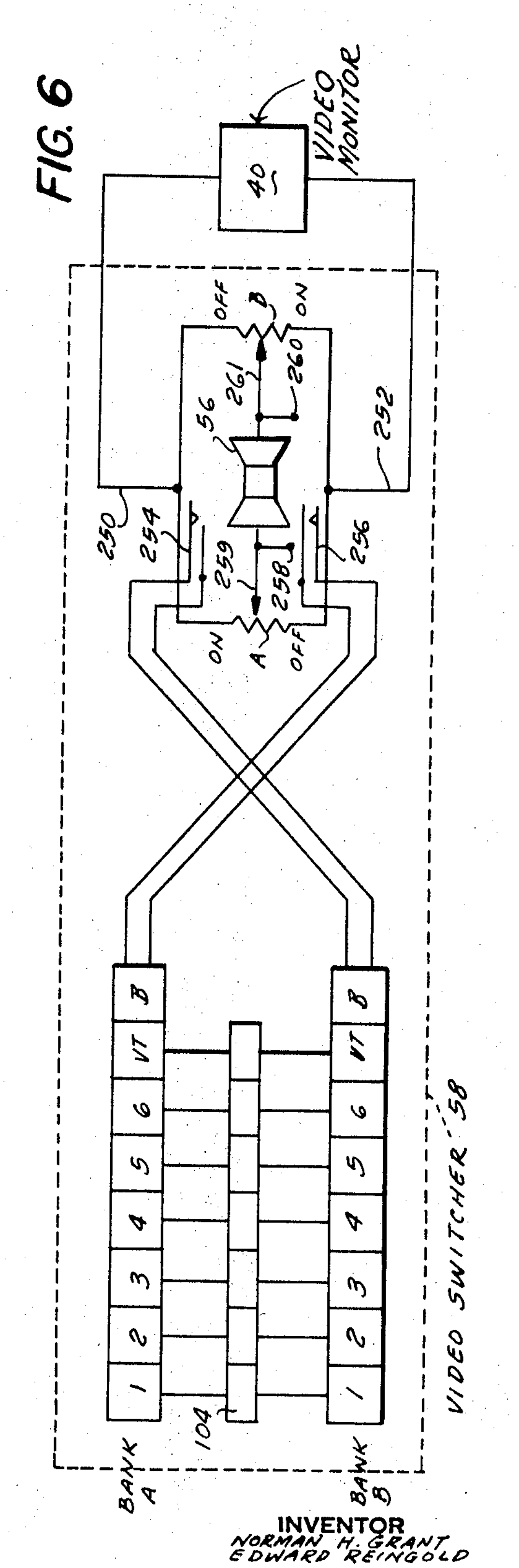
Figure 7:
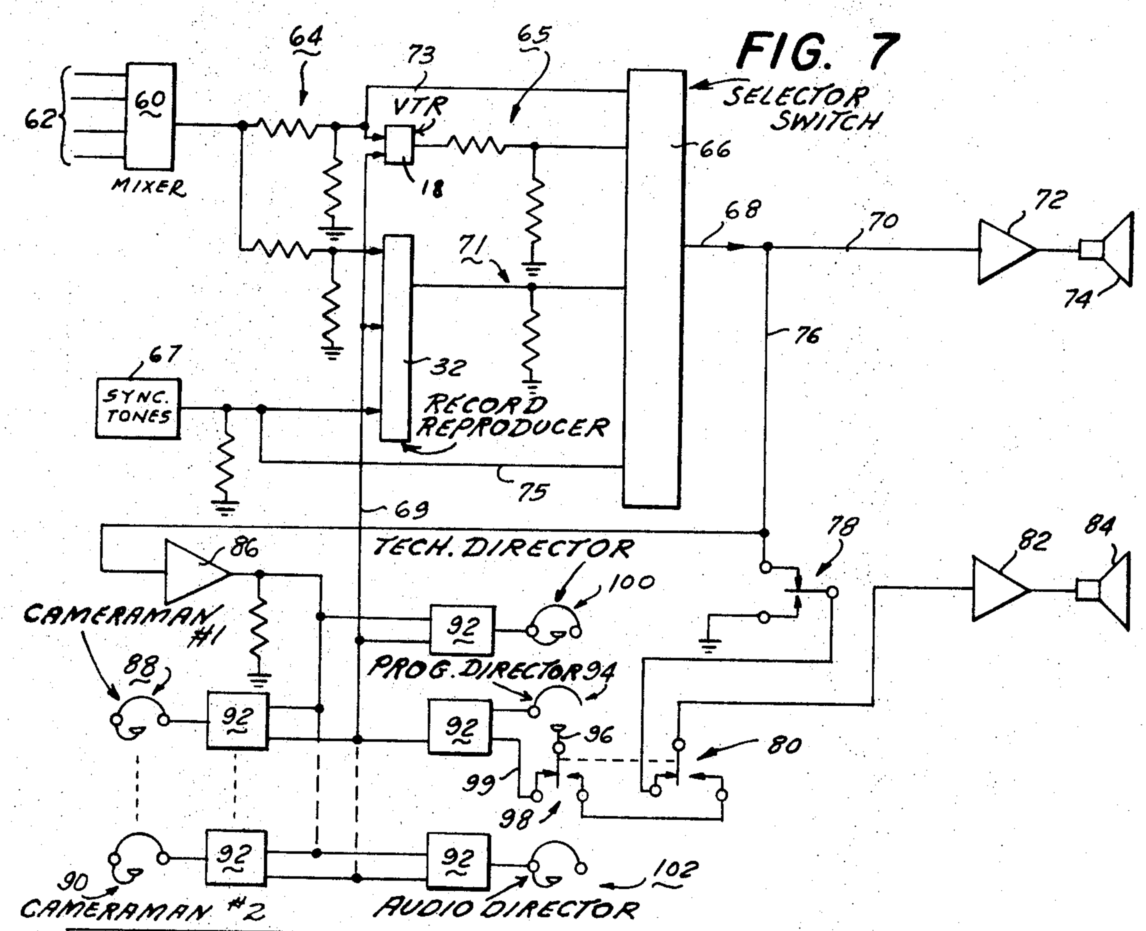
Figure 8:
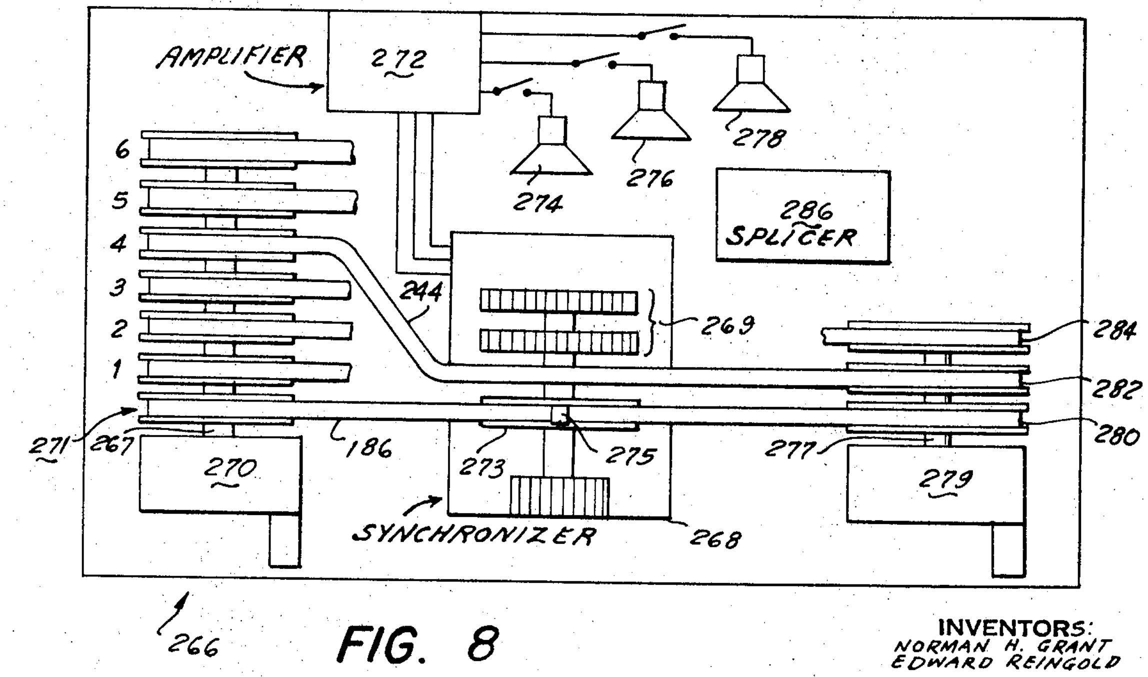

FIGS. *5a* and *5b* are timing charts illustrating the operation of a portion of the present invention;

FIG. 6 is a schematic circuit diagram of a further portion of the equipment of the present invention;

FIG. 7 is a schematic circuit diagram of a further portion of the equipment of the present invention; and FIG. 8 is a schematic plan view of equipment used in practicing the invention.

THE OVERALL SYSTEM

Figures 1, 2:
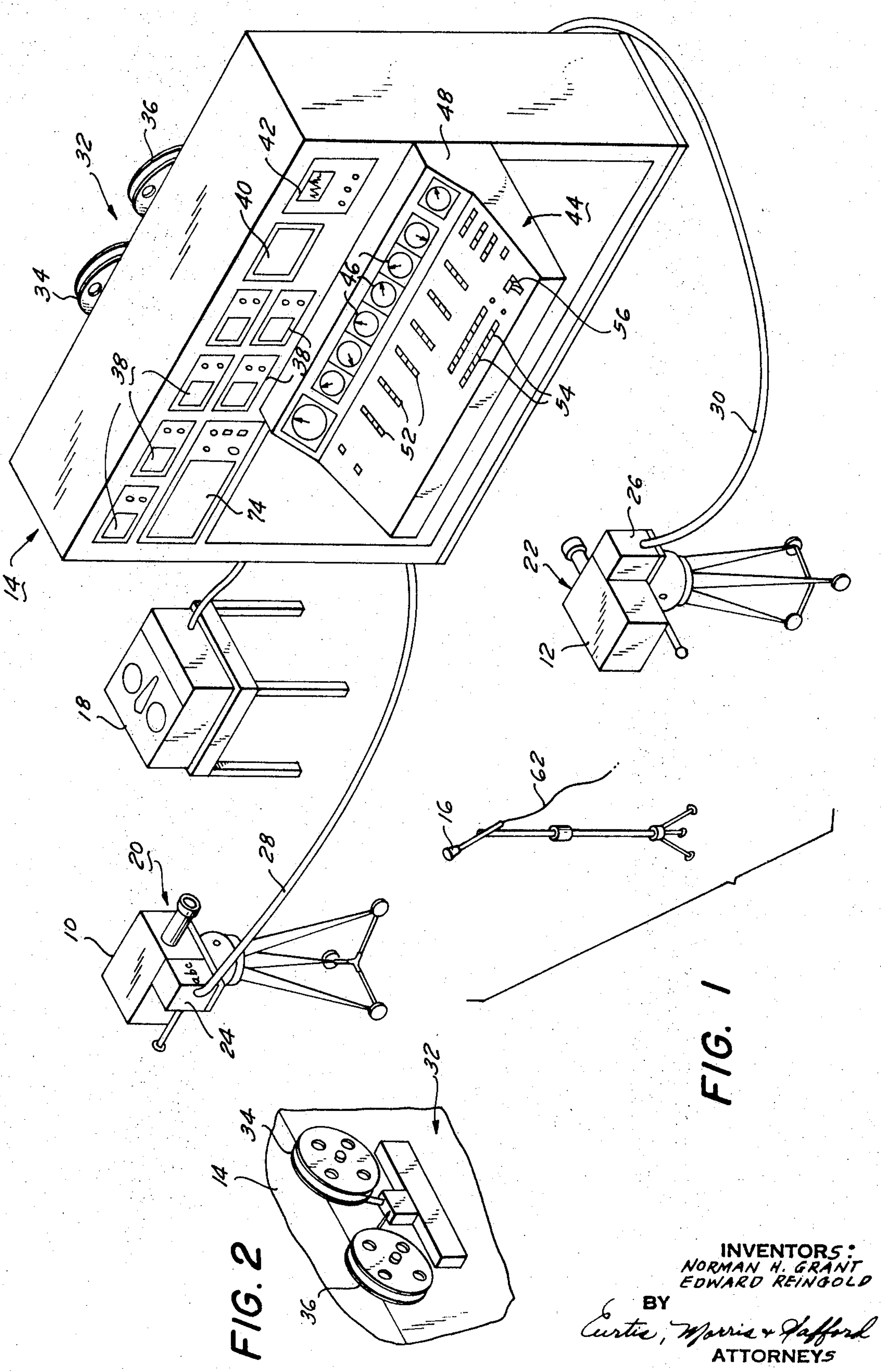
FIG. 1 is a perspective view illustrating some of the major components of the motion picture production system of the present invention.
FIG. 2 is a perspective, partially broken-away view of a portion of the equipment shown in FIG. 1.

The motion picture production system shown in FIG. 1 includes combined motion picture and video camera units 10 and 12, a remote control unit 14, at least one microphone 16, and an optional video tape recorder and reproducer 18. For the sake of clarity of the drawings, only two camera units 10 and 12 and one microphone 16 are shown in FIG. 1. However, virtually any desired number of camera units and microphones can be used, in accordance with the use to which the invention is put. The control unit 14 shown in FIG. 1 is adapted to operate up to six camera units and six or more microphones.

Each of the camera units 10 or 12 consists of a conventional motion picture camera 20 or 22, and a video camera 24 or 26, connected to operate together in an arrangement which is well known in the prior art. The image which is received by the lens of the camera unit passes through a beam splitter (not shown) which transmits 75 percent of the light through to the film of the motion picture camera, and deflects 25 percent of the light into the video camera. Thus, when the camera unit 10 or 12 is turned on, both the video camera and the motion picture camera will record the same image.

It is preferred that the motion picture camera be a 16-millimeter film camera. Of course, the camera may be of 35 millimeter or any other size, but the 16-millimeter size is preferred in order to enhance the portability and reduce the cost of the production system. The video camera preferably is a relatively sensitive camera such as that known as the "plumbicon" camera.

The video signals from the video cameras 24 and 26 are transmitted through cables 28 and 30 to the control unit 14. The video signals from each camera are reproduced on one of several small television receiver screens or monitors 38 in the control unit. There are six such monitors, one for each of six cameras which can be used in the system. The video signal from the camera unit which actually is being used to film the program is displayed on a larger receiver or monitor 40. Simultaneously, an oscilloscope 42 gives a visual indication of the video signal intensity and waveform of the selected video camera.

As the video signals are being displayed in the control unit 14, the program sound from microphone 16 is conducted through a cable 62 to an audio recording unit 32 (see FIG. 2) which is mounted at the rear of the control unit 14. As will be described in greater detail below, tone code signals identifying the particular camera unit in operation are recorded on the magnetic tape of the recording and reproducing unit 32, together with instructions from the program director for operating the cameras and editing the film.

The remote control unit 14 is operated by an operator who works at a keyboard 44 which forms a part of the control unit 14. The keyboard 44 includes six sets of actuating keys 52, one set for each of the six camera units. The keys 52 are used to manually start and stop the cameras, or to select an automatic mode for their operation. Also, there are six clocks 46, each of which indicates the amount of filming time left on a particular camera before it runs out of film. A similar timing clock 48 is provided for the audio recording unit 32. Further keys are provided to operate the audio recording unit, and a total elapsed time clock 50 also is provided. Two rows of keys 54 and a "dissolve" lever 56 are parts of a switching unit 58 (see FIG. 6) by means of which switching from one camera unit to another is accomplished automatically by simply pressing a numbered switch key corresponding to the new camera unit desired. The dissolve lever 56 provides for gradually fading out the video picture from one camera while intensifying the video picture from another camera and, as will be explained more fully hereinafter, it provides for the recording of unique "dissolve" signals on the film to enable the film to be edited more easily.

THE AUDIO SYSTEM

Figures 3, 4:
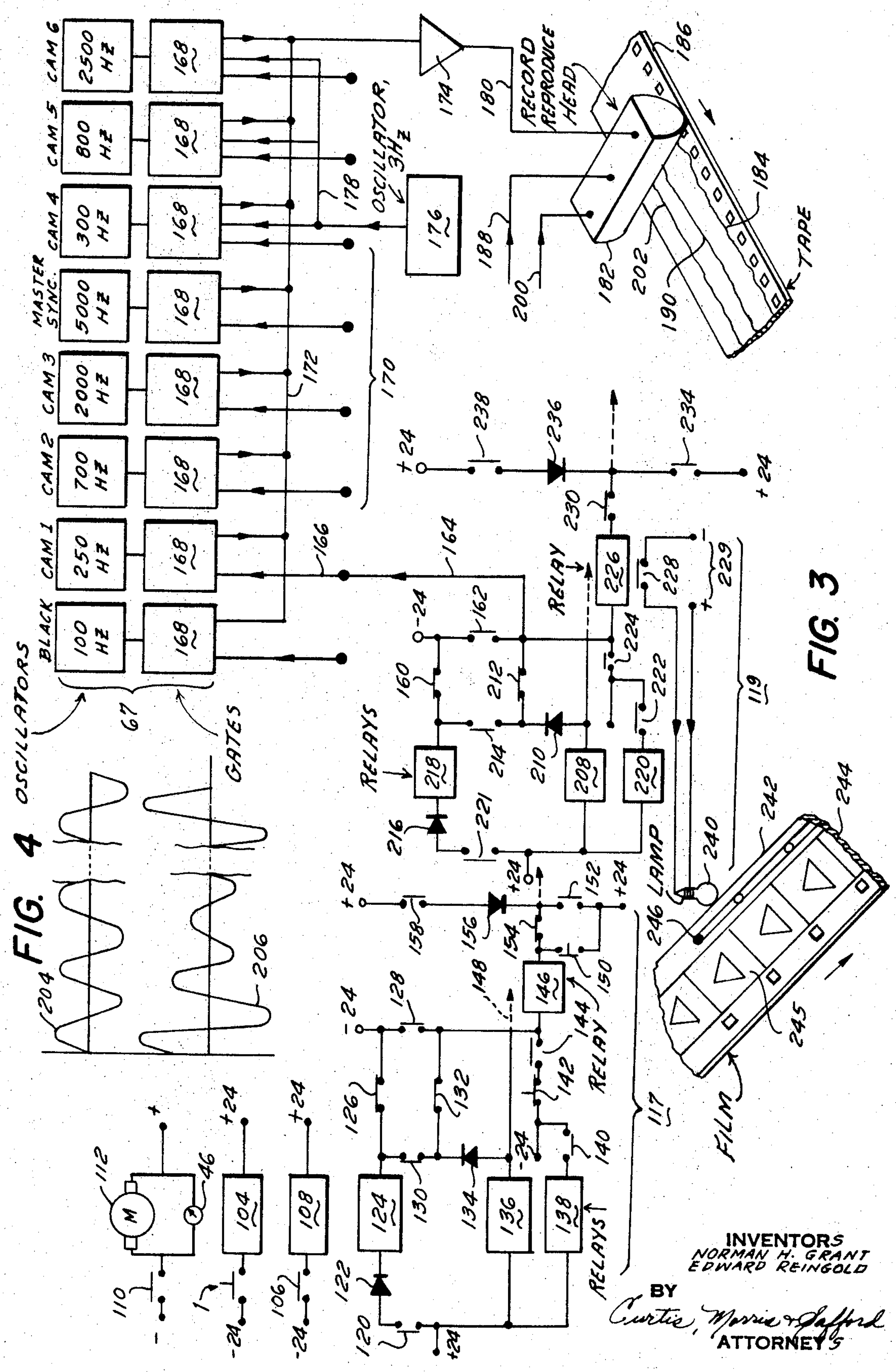
FIG. 3 is a schematic circuit diagram of a portion of the control circuit of some of the equipment shown in FIG. 1.
FIG. 4 is a graph illustrating the waveforms of some of the electrical signals in the circuit shown in FIG. 3.

FIG. 7 is a schematic circuit diagram of the audio system of the present invention. Cable 62 in the upper left-hand corner of FIG. 7 conducts the program sound from one or more microphones such as microphone 16 shown in FIG. 1 into a conventional audio mixer 60. The output of the audio mixer 60 is sent through suitable coupling resistance networks 64 to the video tape recorder 18, and also to the audio recorder/reproducer 32. The video tape recorder 18 and the audio tape recorder/reproducer 32 both also receive and record voice signals from the program director and other personnel over a communication line 69. Also, the audio tone code or "sync" tone signals mentioned previously are developed by a sync tone generator 67 and are recorded in the recorder/reproducer 32 simultaneously with the director's voice signals and the program sound. As will be explained in greater detail below, and as is shown in FIG. 3, the three audio signals are recorded in three separate tracks on the magnetic tape of the recorder 32.

The tape recorder/reproducer 32 is of a well-known 3-track type which uses magnetic tape with sprocket holes in one edge. The use of tape with sprocket holes is preferred because it facilitates the editing process.

The audio signals from the video tape recorder 18 are sent through a suitable coupling network 65 to a selector device 66. Similarly, the reproduced sound from the recorder/reproducer 32 is sent through a suitable coupling network 71 to the selector 66. Also, the program sound is conducted directly from the input of the video recorder 18 to the selector 66, and the sync tones are connected directly from the output of the sync tone generator to the selector 66.

The selector 66, which can be, for example, a multiposition selector switch, normally is set to conduct the program sound over its output lead 68. The program sound then is conducted over a lead 70 through an amplifier 72 to a loudspeaker 74 in the remote control console 14 (see FIG. 1) where it is reproduced so that the operator of the console and the director can hear the program sound as it is being recorded. The output of the selector 66 also is conducted over a line 76, through an amplifier 86, through a plurality of interphone units 92, and into each of a plurality of interphone headsets 88, 90, 94, 100 and 102. The headphone sets 88 and 90 are provided for the two cameramen operating the cameras 10 and 12. Of course, there will be as many headphone sets as there are cameramen.

The headphone set 94 with its microphone 96 is worn by the program director. The output of the microphone 96 is directed by a switch 98. With the switch 98 position to the left as it is shown in FIG. 7, the director's voice passes through a conductor 99 and an interphone unit 92 to the interphone line 69 through which it is connected to the tape recorder/reproducer 32, video tape recorder 18, and to all of the other headphone sets 88, 90, 100 and 102.

Headphone set 100 is worn by the technical director; that is, by the person who actually operates the console 14 pursuant to the instructions of the director, and the headphone set 102 is worn by the audio director whose job it is to control the audio recording and reproducing in the system. The output from the selector 66 is conducted to a remote loudspeaker 84 through switches 78 and 80, and an amplifier 82, when the switches 78 and 80 are in the position shown in FIG. 7. The contact arm of switch 80 is mechanically linked with the arm of switch 98 so that when switch 98 is moved to the right-hand contact, the contact arm of switch 80 also is moved to its right-hand contact, and the director's voice, instead of being conducted to the headphone sets of the other personnel, is connected to the loudspeaker 84. The contact arm of the switch 78 can be moved to the lower contact of the switch so as to ground the input to amplifier 82 and to prevent the signals from line 76 from reaching the speaker 84.

When the motion picture production system of the present invention is in operation, the program director normally tells all of the operating personnel what to do, and the other personnel remain quiet. Thus, the director's voice is recorded on the tape recorder 32 simultaneously with the programmed sound and the sync tones. The technical director operates the console 14, and, together with the cameramen and audio operator, operates the various cameras and other equipment in accordance with the program director's instructions.

SYNC TONE, FOGGING AND CAMERA START-STOP CONTROL SYSTEM

FIG. 3 illustrates schematically the system used to control the starting and stopping of the individual camera motors, and the recording of the audio sync tones and colored fogging signals which identify the cameras in operation.

In the present system, the camera motors are adapted to be started and stopped either manually or automatically. However, only the automatic mode of operation will be described in detail herein since the operation in the manual mode will be quite evident once the automatic mode is understood.

Assuming that the motor control buttons 52 on the console 14 (FIG. 1) have been actuated in a manner such that the automatic mode of operation has been selected, merely pressing the appropriate button in the video switcher 58 (FIG. 6) will automatically switch the corresponding camera into operation. The video switcher buttons are divided into two groups, "Bank A" and "Bank B." Each of the first six buttons in each bank is given a number from 1 to 6 corresponding to the number of the camera which the button controls. A seventh set of buttons labeled VT is provided to enable reproduction of the video tape recorder output on the monitor screen 40. An eighth set of buttons labeled B is provided to indicate "black" operation; that is, operation with no picture whatsoever. Throughout the following examples, the camera 10 shown in FIG. 1 will be designated camera number 1, and the camera 12 in FIG. 1 will be designated camera number 2.

As will be explained in greater detail later in this description, the handle 56 (see FIG. 6) should be in either its lowermost or its uppermost position, except during a "dissolve" operation. If lever 56 is in its lowermost position, the number 1 button in Bank B should be pressed to start camera number 1. If lever 56 is in its uppermost position, then button number 1 in Bank A should be pressed to start camera number 1. When the proper button number 1 is pressed, a relay 104 (FIGS. 3 and 6) will be actuated.

Referring now to the upper left-hand corner of FIG. 3, relay 104 has a contact 106 which closes upon the energization of relay 104 and energizes a time-delay relay 108. Relay 108 has a contact 110 which closes upon the energization of relay 108 to energize the motor 112 and the film supply clock 46 of camera number 1. The relay 108 is a time-delay relay which opens its contacts approximately 5 seconds after it is deenergized. Provision of such a 5-second holding period for each camera motor insures that segments of the program will not be missed while the system is switching from one camera to the next, and gives some editorial freedom in cutting and splicing the film. Upon the depression of any of the buttons in either bank of video switcher buttons shown in FIG. 6, any other camera in that bank which is operating immediately will be deenergized by well-known video-switcher circuitry in the switcher 58. Of course, the previous camera continues to run for 5 seconds after the new camera has been started, as has been explained above.

It is not desirable to start using the film taken by a camera immediately when it is first switched into operation because the synchronous camera motor needs a certain amount of time (around 200 to 250 milliseconds) in which to reach synchronous speed. If the film shot during this starting period were used, the pictures probably would be unsatisfactory. Therefore, the sync tone and fogging signals are not switched on in the new camera until after a time delay sufficient to insure that the camera motor is running at synchronous speed. Although it requires only around 200 milliseconds for a motor to reach full speed, recording of the sync tones is delayed approximately 400 milliseconds in order to make certain that the camera motor has reached full speed.

Figures 5A, 5B:
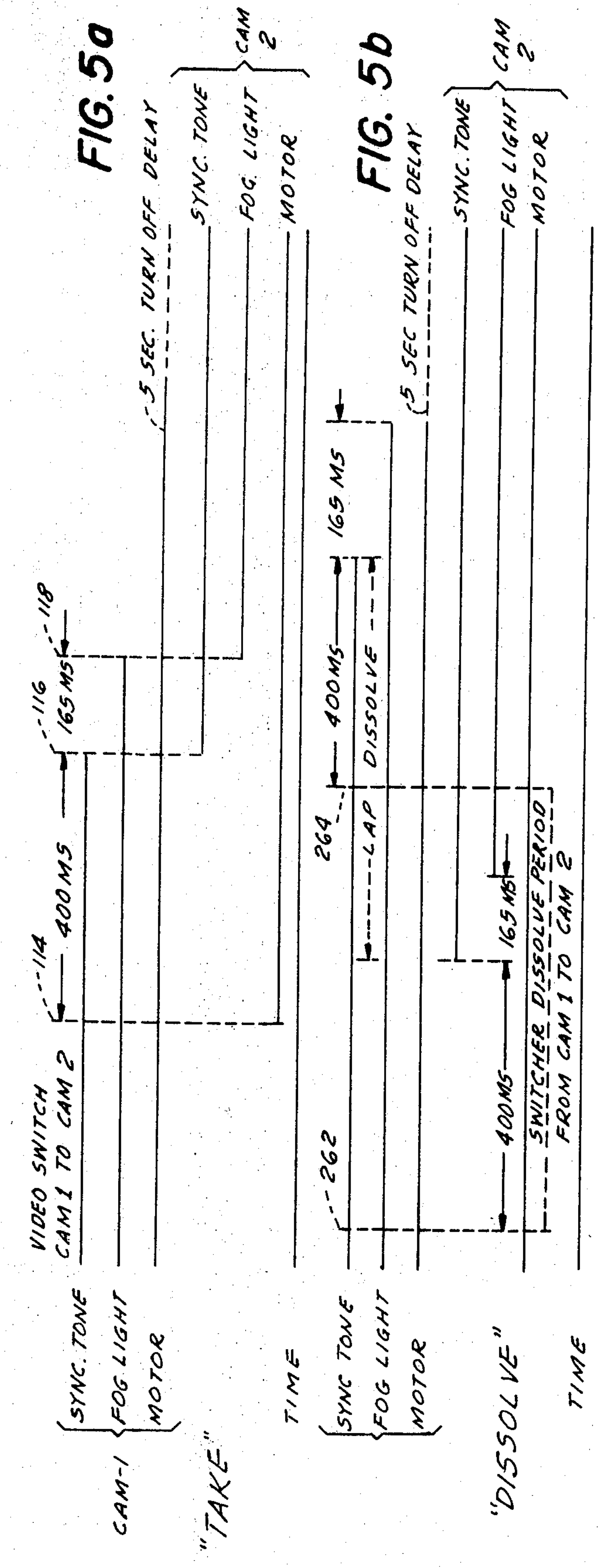

FIG. 5*a* shows the timing of the operation of the camera motor, fogging lamp and sync tone generator of camera 1 and camera 2 while the system is switching automatically from camera 1 to camera 2. In FIG. 5*a*, it is assumed that camera 1 initially is running and the button for camera 2 is pressed at the time indicated by the dashed line 144. During an approximately 400-millisecond period of time, the camera motor number 2 is allowed to accelerate to synchronous speed. At the end of this period, marked by the dashed line 116, the sync tone signal for camera 2 starts being recorded, and the sync tone signal for camera 1 ends. The fog light on camera 1, however, continues for another 165 milliseconds, and the fog light for camera 2 is turned on at the end of that time period, which is indicated by the dashed line 118. The reason for the additional delay of 165 milliseconds in turning on the fog light for camera 2 is that the fog light cannot be positioned in the camera in a location such that it can start marking the precise frame at which the switchover occurs because that frame then is physically inaccessible. Therefore, the fog light must be positioned about four frames away from the location of the frame at the time of switchover, and the delay time of 165 milliseconds is the approximate time required for the film to travel a distance equivalent to four frames. Thus, by the provision of this additional time delay, the fog mark on the film will be precisely aligned with the exact frame at which the switchover occurs.

The control circuit shown in FIG. 3 includes two segments 117 and 119. For the sake of clarity, these portions of the circuit are shown only for the number 1 camera. It is to be understood, of course, that a substantially identical control circuit will be provided for each of the other cameras.

When the relay 104 is energized by the depression of pushbutton number 1, its normally closed contact 126 opens and its normally open contact 128 closes. This action energizes a time-delay relay 136 by a path from a negative 24-volt source, through contact 128, through normally closed contact 132 of another relay 146, and a diode 134. The contacts of the time-delay relay 136 do not close until 400 milliseconds after the relay has been energized. This provides the 400-millisecond time delay in which the camera motor is allowed to accelerate to full speed.

When the single contact 140 of time-delay relay 136 finally closes, it energizes another relay 138. The energization of relay 138 closes its normally open contacts 120 and 158. The closing of contact 158 connects relay 146 to a positive 24-volt source through contact 158, a diode 156, and a normally closed contact 154 of a relay 124, and connects the opposite terminal of relay coil 146 to a negative 24-volt supply through closed contact 128 of relay 104. Contacts 152 and 144 of relay 146 then close, and further contacts (not shown) of relay 146 open to deenergize relays 136 and 138 to prepare them for the next operation. The contacts 152 and 144 then maintain the energization of the coil of relay 146 until the camera motor is turned off.

The contacts 142 and 150 are contacts of an automatic-to-manual switch which comprises one of the keys 52 of the motor control keys on the keyboard 44 shown in FIG. 1. This switch is shown in FIG. 3 in the "automatic" position.

Referring next to the right-hand portion 119 of the control circuit shown in FIG. 3, when relay 146 is actuated, its normally closed contact 160 is open, and its normally open contact 162 is closed. The closing of contact 162 connects a negative 24-volt source to an output lead 164, thus sending a voltage signal over that output lead to a selected input lead 166 of the sync tone generator 67.

THE SYNC TONE GENERATOR

The sync tone generator 67 includes a plurality of oscillators, one for each of the six cameras, plus a "black" oscillator to indicate that the film is to be black (that is, it has no picture), and a "master sync" oscillator to indicate the mode of operation in which all of the cameras are running simultaneously. Each of the oscillators runs continuously but is isolated from a common output lead 172 by a conventional gating circuit 168. When the gating circuit 168 receives a gating voltage signal over its input lead 166 or 170, the gating circuit provides a conductive path from the output of the oscillator to the output lead 172. The oscillator output signal then is conducted to an amplifier 174 whose output is conducted over a lead 180 to one channel of the magnetic recording head 182 of the recorder/reproducer 32. The oscillator signal is recorded in one track 184 of magnetic tape 186 which has sprocket drive holes in one edge. Simultaneously, as has been explained above, the instructions from the program director are conducted over an input lead 188 to a separate channel of the recording head 182 which records the program director's voice in a track 190 on the tape 186. The program sound is conducted over a third separate section of the recording head 182 and recorded in a third track 202 which is generally parallel to the other two tracks.

In the foregoing system, the particular oscillator identifying a particular camera or function is allowed to conduct signals for recording only when its gating circuit 158 is turned on by a gating voltage signal received at the end of a 400-millisecond time delay created by the control circuit described above. In accordance with the present invention, the oscillation frequencies of the oscillators for cameras 1, 2 and 3, "black" and "master sync" are separated relatively widely. Specifically, the frequency of the "black" oscillator is 100 Hz.; camera 1, 250 Hz.; camera 2, 700 Hz.; camera 3, 2,000 Hz.; and "master sync" 5,000 Hz. The frequencies of the signals from the oscillators for cameras 4, 5 and 6 are not as widely separated from the other frequencies; in fact, they are made relatively close in frequency to the signals from oscillators 1, 2 and 3, respectively. Specifically, the frequency of the camera 4 oscillator is 300 Hz.; camera 5, 800 Hz.; and camera 6, 2,500 Hz. However, a very low-frequency alternating signal is added to each of the signals from the camera 4, 5 and 6 oscillators. The low-frequency signal is generated by a bistable multivibrator 176 oscillating at a frequency of about 3 cycles per second. Thus, whenever any of the 4, 5 and 6 oscillators is turned on, the output signal which is recorded in the sync tone track 184 is a modulated sine wave such as the wave 206 shown in FIG. 4. Therefore, one listening to the tone produced by such a wave would hear a tone close in frequency to the tone from one of the oscillators 1, 2 and 3, but varying in amplitude at the rate of about 3 cycles per second. It should be understood that the modulating voltage developed by the multivibrator 176 has a square waveform. Although the wave 206 in FIG. 4 appears to have only a few cycles which are of reduced amplitude, actually many more cycles will be of reduced amplitude. However, the drawing is intended only to illustrate the principle of operation under discussion, and is foreshortened for the sake of clarity.

FIG. 4 shows an unmodulated 250-Hz. wave 204 which would be produced by the oscillator for camera 1. A modulated wave 206 of 300-Hz. frequency as produced by the oscillator for camera 4 also is shown in FIG. 4, in approximately proper phase relation to the wave 204.

One advantage obtained by using the above system in the present invention is that it produces audible tones which are capable of being readily distinguished from one another, but whose frequencies do not extend over a relatively wide band. Without the use of the modulation feature of the system, relatively great frequency separation would be required to enable the human ear to distinguish among several different tones. Because there are as many as six camera oscillators and two function oscillators in the system, the separation required at the high frequency end of the spectrum covered by the frequencies used in the system would be so high that relatively expensive sound reproduction equipment would be required to effectively reproduce the signals during editing of the film. Use of the modulation system reduces the required bandwidth of the reproducing apparatus without sacrificing the high cost of sound reproducing equipment.

FOGGING LAMP CONTROL SYSTEM

Referring again to the portion 119 of the control circuit shown in FIG. 3, when the contact 162 of the relay 146 closes and sends a pulse to the gating circuit 168 to start the recording of sync tone signals, it also completes a conductive path from a negative 24-volt source, through the normally closed contact 212 of a relay 226, and through a diode 210 to a time-delay relay 208. After a time-delay of 165 milliseconds, the single contact 222 of relay 208 closes and energizes another relay 220. When relay 220 closes, its contact 238 closes and energizes the relay 226 in much the same manner as the relay 146 is energized in portion 117 of the circuit. Contacts 224, and 234 of relay 226 close when relay 226 is energized. Contacts 224 and 234 lock the contacts of relay 226 in a closed position, and other contacts (not shown) deenergizes relays 208 and 220 to prepare them for the next operation.

The closing of contact 228 completes the circuit between a power supply 229 and a fogging lamp 240 which is located in camera number 1. The fogging lamp 240 emits colored light through an appropriately shaped slot in a shield (not shown) and thus forms a latent image which later is developed to form a colored track 242 along one edge of the motion picture film 244. Color motion picture film is used in the preferred embodiment of the present invention. Thus, it is preferred to identify each camera by using a unique color for the light from the lamp 240 in each camera. If black and white film is used, the shape of the lamp shields can be made unique in each camera so as to provide a unique identification track on the film. The start of the colored track or "fogging" mark is indicated by the number 246. This starting point is located adjacent to the picture frame 245 which was being exposed at the time when the sync tone recording started for camera 1. Thus, when the film is being edited, the program sound and the picture on the film can be aligned very precisely simply by listening to the sync tone and watching the fogging mark on the film, and then simply aligning the start of the sync tone with the start of the fogging mark. The 165-millisecond delay in turning on the fogging lamp 240 is provided because the lamp 240 cannot be positioned so as to start the fogging mark adjacent frame 245, but must be positioned about four frames away from the film exposure station. The time it takes for the frame 245 to move four frames is approximately 165 milliseconds in the specific cameras used in the preferred embodiment of the invention.

AUTOMATIC SWITCHING BETWEEN CAMERAS

When one of the buttons in the same bank is pushed in the video switcher 58 (FIG. 6) to energize a camera different from camera number 1 (e.g., camera No. 2), the video switcher automatically deenergizes relay 104. Referring again to circuit portion 117 of FIG. 3, the result of deenergizing relay 104 is that normally closed contact 126 returns to its closed position, and normally open contact 128 returns to its open position. However, normally open contact 130 of relay 146 still is closed, and normally closed contact 132 of relay 146 still is open. Therefore, the time-delay relay 136 again is energized, through contacts 126 and 130 and diode 134. This again energizes relay 138 after a 400-millisecond time delay, with the result that contact 120 of relay 138 closes and energizes relay 124. Normally closed contact 154 of relay 124 then opens and deenergizes relay 146. This reopens contact 162 in circuit portion 119, thus removing the signal from leads 164 and 166, turning off gate 168 and ending the recording of a sync tone from the "CAM 1" oscillator on the tape 186. Thus, the sync tone signal for camera 1 is turned off 400 milliseconds after a button for a new camera has been pushed.

The opening of relay 146 once again energizes time-delay relay 208, through closed contact 160, closed contact 214 of relay 226, and diode 210. After a 165-millisecond time delay, relay 220 again is energized, and closes its contact 221 so as to energize relay 218 through diode 216 and contact 160. Contact 230 of relay 218 then opens and deenergizes relay 226. This opens contact 228 and turns off the fogging light 240. Thus, the fogging light 240 is turned off 165 milliseconds after the sync tone generator is turned off.

With the deenergization of both relays 146 and 226, all of the relays in circuit portions 117 and 119 return to their initial deenergized state. Then, 5 seconds after the relay 104 is deenergized, the relay 108 releases its contact 110, and the camera motor 112 stops. As has been noted above, substantially identical control circuitry has been provided for each of the six cameras which can used in the system. Thus, when the camera 2 button is pressed in the video switcher 58 (FIG. 6) in the same bank as the button for camera 1, camera 2 will be turned on automatically in accordance with the same timing cycle as camera 1 went through when its button was pushed. The timing of such a switchover is illustrated in FIG. 5*a*.

LAP DISSOLVE SYSTEM

In the present invention, a unique system is used to provide for a "lap dissolve." As is well known in the art, "lap dissolve" is a term used to describe a mode of operation in which two pictures are superimposed upon one another for a period of time on a television or motion picture screen. In the usual video system, this function is performed by means of a well-known video switcher such as the switcher 58 illustrated schematically in FIG. 6. In the video switcher, the lap dissolve lever 56 is coupled to the wiper arms 259 and 261 of two potentiometers, which are labeled A and B in FIG. 6 to indicate, respectively, the "Bank A" or "Bank B" row of buttons to which the potentiometer corresponds. The leads 258 and 260 to the potentiometer wipers are connected in a well-known manner into the video switcher circuitry, and to the output monitor 40 through leads 250 and 252.

In accordance with the present invention, limit switches 254 and 256 are positioned, respectively, at the upper and lower ends of the path of travel of the dissolve lever 56. When the dissolve lever 56 contacts the switch 254, the switch is closed and deenergizes all of the relays which have been energized by the pressing of any of the buttons in relay Bank B. Similarly, when the dissolve lever contacts and closes the limit switch 256, all of the relays which have been energized by the depression of any of the buttons in Bank A are deenergized. However, when the lever 56 is not in contact with either of the normally open limit switches, as is the case during movement of the lever 56 during a "disslolve" operation, then all cameras in operation in either Bank A or Bank B run simultaneously.

As it was mentioned above, the handle 56 should be in either its uppermost or lowermost position at all times except during a "dissolve" operation. Lever 56 should be in its lowermost position if the Bank B is being used to control the operation of the camera. In this position limit switch 256 is closed and all switches in Bank A are deactivated so that it is not possible for two cameras to operate simultaneously unless all cameras deliberately are activated simultaneously by means of a separate switch. Similarly, lever 56 should be in its uppermost position if Bank A is to be used to control the camera, so that limit switch 254 will be closed and the Bank B switches will be deactivated.

A "dissolve" operation can be explained best by the following example: FIG. 5*b* is a timing diagram for this example. Assume that camera 1 is operating, with the lever 56 in its lowermost position, and that it is desired to dissolve from camera 1 to camera 2. First, the camera 2 button is pressed in the upper row A. Then, the lever 56 is moved upwardly away from limit switch 256, thus activating the Bank A switches. When the lever 56 leaves switch 256, the motor for camera 2 starts. The time at which the motor starts is indicated by line 262 in FIG. 5*b*. As the lever 56 is moved upwardly, more and more of the video signal voltage from the A camera is applied to the output monitor 40 while correspondingly less and less video signal voltage is applied from the B camera. Although the output monitor 40 will show a video picture which is a combination of the signals from cameras 1 and 2, the sync tones, pictures and fogging signals continue to be recorded for camera 1 in the same manner as they had been recorded prior to the pushing of the camera 2 button. After a 400-millisecond motor acceleration time delay, the sync tone for camera 2 is turned on, and after a further 165-millisecond delay, the fogging light for camera 2 is turned on. Then, at a time indicated by dashed line 264, the handle 56 is moved to its uppermost position, thus closing switch 254, and deenergizing relay 104 of camera 1. As has been explained above, the sync tone for camera 1 stops after a 400-millisecond delay, and the fog light for camera 1 stops after a further 165-millisecond delay, and the motor for camera 1 turns off after 5 seconds.

During the editing of the film from cameras 1 and 2, the "lap dissolve" portion of the film readily can be identified by the film editor as the time from the beginning of the sync tone from the second camera to the end of the sync tone from the first camera. Thus, the lap dissolve can be printed quickly and accurately by merely aligning the sync tones and fogging signals.

FILM EDITING METHOD

FIG. 8 shows an editing device 266 which can be used to edit the film produced by the foregoing production system. The editing device 266 includes a conventional synchronizer 268 which has several sprocketed drive wheels 269 for driving film, and a separate sprocketed drive wheel 273 for driving the magnetic tape 186 bearing the program sound, the sync tones, and director's voice signals. The synchronizer 268 includes a drive motor, and a magnetic playback head 275 for reproducing the magnetic signals on the tape 186.

The audio signals are sent from the playback head of the synchronizer to an amplifier 272 which reproduces each of signals recorded in the three different tracks over one of three separate loudspeakers 274, 276 and 278. All of the loudspeakers can be operated simultaneously, if desired. Switches are provided to disable one or more of the speakers if it is not desired to listen to the sound from that speaker.

A rewinder and film storage device 270 is provided. On a central shaft 267 are mounted six rolls of film marked with numbers 1 through 6, each roll coming from a correspondingly numbered camera. A separate reel 271 is provided to store the magnetic sound tape 186. A takeup device 279 is provided at the right side of the table 266. Mounted on a central shaft 277 are a sound tape takeup reel 280, a picture film takeup reel 282, and a reel 284 for storing film cut out of the picture during the editing process. A conventional 16-millimeter film splicer 286 also is provided for splicing the film during the editing process.

In editing the film, the editor reproduces and listens to the director's voice and the sync tone signals recorded on the tape 186. Upon hearing the director's voice indicating which camera is being operated, the editor feeds film from the appropriate reel into the synchronizer 268. In FIG. 8, the film 244 is shown being taken from reel 4 corresponding to camera number 4. The editor then looks at the colored fog mark on the film. The editor then aligns the start of the fog mark with the start of the appropriate sync tone signal, then drives the tape 186 and film 244 together through the synchronizer until the next instructions from the director are heard. Then, the film is cut and spliced, by means of the splicer 286, to film from the next reel. This procedure is repeated until a complete motion picture has been produced. Lap dissolves can be created by overlapping the two filmstrips in the "lap dissolve" areas, and making a combined print of the films, as is well known in the prior art.

Usually, a print of the film stored on reel 282 will be made to be shown on television. However, the film can be shown on television directly, without making a print. The latter procedure makes it possible to take, develop and edit a motion picture which is ready for television viewing in a very short time.

The system and method described above make it possible to produce motion pictures not only very rapidly, but also with a relatively small amount of editing labor. This permits a significant reduction in the cost of producing the film. Also, the system is quite compact and relatively low in initial cost so that it can be packaged and shipped to remote filming sites relatively easily and inexpensively.

There are many changes which can be made in the structure and method described above without departing from the invention. For example, small notches can be cut into each film frame to provide a supplemental means for identifying the camera from which the film originates. The notches produce corresponding images at the edge of each picture frame on the film. For example, film from camera number 4 would have four notch images at the edge of each frame, film from camera 3 would have three such images, and so forth. Other modifications can be made without departing from the invention as it is set forth in the following claims.

I claim:

1. A system for producing motion pictures, said system comprising, in combination, a plurality of motion picture cameras, each having a video camera coupled to it, control means at a station remote from said cameras for selectively starting and stopping each of said motion picture cameras, means for recording indicia identifying the motion picture camera which is operating and the period during which it is operating, and means for simultaneously recording the vocal instructions of a person directing the operation of said control means.

2. Apparatus as in claim 1 in which said indicia recording means includes means for generating and recording a plurality of different audio identification tone signals each of whose tone uniquely identifies one of said motion picture cameras, each of said tone signals being recorded only when its corresponding motion picture camera motor is running.

3, Apparatus as in claim 1 in which said indicia recording means includes means for generating and directing colored light onto a portion of the film in each of said cameras, the color of the light produced by each such means being unique to the camera in which the light-generating means is located.

4. Apparatus as in claim 1 including means for reproducing simultaneously said recorded indicia and said vocal instructions.

5. A system for producing motion pictures, said system comprising, in combination, a plurality of motion picture cameras, each having a lens system and a video camera coupled to receive a portion of the illumination transmitted by said lens system, the remainder of the illumination being transmitted to the film in said camera, a remote control unit, said unit including a keyboard with switching means for automatically stopping one camera motor and starting another in response to the actuation of a switch corresponding to said other camera, a plurality of video receivers in the remote control unit for displaying the video pictures produced by each of said video cameras, and for displaying the video picture produced by the video cameras connected to the film cameras in operation at a given time, an interphone system including a plurality of sets of telephone receivers and transmitters, one set for each camera to be operated, and one for the program director, a microphone system for converting program sound into electrical signals, a synchronizing tone generator for generating tone signals each of which is unique to a particular film camera, magnetic recording/reproducing means for recording in separate tracks on a single magnetic tape the program sound signals, the tone signals and the conversation from the telephone transmitters, lamp means in each film camera for producing a substantially continuous colored mark on the edge of the film in said camera while the motor in the camera is running, and means for effecting the recording of said tone signal and said colored mark for each camera from a predetermined length of time after the motor in that camera starts until the same predetermined length of time after a stop signal is received for that motor.

6. Apparatus as in claim 5 in which the predetermined length of time for the lamp means is longer than the predetermined length of time for the tone signals.

7. A motion picture production method, said method comprising the steps of recording scenes upon motion picture film in a plurality of different cameras, said cameras operating in sequence, recording on the film in each camera during its operating a visible mark identifying the camera and indicating the frames at which the pictures to be used start and stop, recording one of a plurality of audio tone signals at substantially the same time as the recording of said visible marks, each of said tone signals uniquely identifying the camera operating at the time, simultaneously recording the sound for said motion picture adjacent said tone signals on a tape record medium separate from said film, and simultaneously recording vocal instructions directing the operation of the cameras.

8. A method as in claim 7 including editing the film produced by said cameras to produce a single motion picture film, said editing comprising the steps of reproducing said tone signals and said vocal instructions, displaying said visible marks on said film, aligning the start of each of the visible marks in the portion of the film to be used from each camera with the start of the corresponding tone signal on said tape, and cutting said film and splicing the cut film portions together in accordance with said tone signals, said visible marks, and said reproduced vocal instructions.

9. In a motion picture production system utilizing a plurality of combined motion picture and video camera units, means for remotely controlling said camera units so as to select which is to be in operation at a particular time, means for recording on the film of a selected one of said cameras a visual signal identifying said camera, means for recording the program sound for said motion picture on a separate record medium and simultaneously recording a tone code signal identifying said selected camera, means for recording a dissolve change from a first to a second camera, said dissolve recording means comprising means for recording both the tone code and visual signals from both cameras for as long as any visual image is desired from the first camera, and terminating the tone code and visual signals for the first camera in response to actuation of a switch indicating the end of the desired image from the first camera.

10. Apparatus as in claim 9 including means for effecting the recording of said tone code and visual signals for each camera substantially continuously starting a predetermined length of time after the motor for that camera starts, and ending the tone and visual identification signals for the first camera said predetermined length of time after the actuation of said switch.

11. A system for producing motion pictures, said system comprising, in combination, a plurality of motion picture cameras, each having a video camera coupled to it, control means at a station remote from said cameras for selectively starting and stopping each of said motion picture cameras, means for recording indicia identifying the motion picture camera which is operating and the period during which it is operating, and means for simultaneously recording the vocal instructions of a person directing the operation of said control means, said indicia recording means including means for generating and recording a plurality of different audio identification tone signals each of whose tone uniquely identifies one of said motion picture cameras, each of said tone signals being recorded only when its corresponding motion picture camera motor is running, means for generating and directing colored light onto a portion of the film in each of said cameras, the color of the light produced by each such means being unique to the camera in which the light-generating means is located, and means forming a part of said control means for effecting the recording of said tone signals and said colored light substantially continuously from a predetermined length of time after the start of the camera motor until the same predetermined length of time after the generation of a turnoff signal for said motor.

12. In a motion picture production system utilizing a plurality of combined motion picture and video camera units, means for remotely controlling said camera units so as to select which is to be in operating at a particular time, means for recording on the film of a selected one of said cameras a visual signal identifying said camera, means for recording the program sound for said motion picture on a separate record medium and simultaneously recording a tone code signal identifying said selected camera, means for recording a dissolve change from a first to a second camera, said dissolve recording means comprising means for recording both the tone code and visual signals from both cameras for as long as any visual image is desired from the first camera, and terminating the tone code and visual signals for the first camera in response to actuating of a switch indicating the end of the desired image from the first camera, said dissolve recording means including a video switcher with dual sets of actuating switches for said camera units, and dissolve transition means including means for varying the amount of video signal provided in the final video picture being produced from each of a pair of different video cameras, one video camera being actuated from one of said switch sets and the other from the other of said switch sets.

13. Apparatus as in claim 12 in which each switch within each set includes means for deenergizing all other camera units within the set when one switch in the set is actuated.

14. A system for producing motion pictures, said system comprising, in combination, a plurality of motion picture cameras, each having a video camera coupled to it, control means at a station remote from said cameras for selectively starting and stopping each of said motion picture cameras, means for generating and recording a plurality of different audio identification tone signals each of whose tone uniquely identifies one of said motion picture cameras, and means for recording substantially simultaneously on side-by-side tracks on a record medium, program sound associated with the pictures being taken, said audio identification signals, and the vocal instructions of a person directing the operating of said control means.

15. A system as in claim 14 including means for recording a separate unique tone signal to indicate the condition in which no pictures are being taken.

16. A system as in claim 14 including means for recording a separate unique tone signal to represent the condition in which all cameras are running simultaneously.

17. A system as in claim 14 in which each of said tone signals is substantially continuous.

18. A system as in claim 17 including means for generating and directing colored light onto a portion of the film in each of said cameras, the color of the light produced by each such means being unique to the camera in which the light-generating means is located.